United States Patent Office 3,374,274
Patented Mar. 19, 1968

3,374,274
PROCESS FOR THE PRODUCTION OF AROMATIC THIOLS AND AROMATIC SULFIDES
James D. Spainhour, Bartlesville, Okla., assignor to Phillips Petroleum Company, a corporation of Delaware
No Drawing. Filed Sept. 15, 1964, Ser. No. 396,739
10 Claims. (Cl. 260—609)

This invention relates to the production of aromatic thiols. This invention also relates to the production of aromatic sulfides. In one of its aspects, the invention relates to a process for producing an aromatic thiol and an aromatic sulfide by reacting a nuclear monohalo-substituted aromatic compound with an excess (above equimolar) of an alkali metal sulfide. In a more specific aspect, the reaction takes place in a polar organic solvent. In a still further aspect, an aromatic thiol and a diaryl sulfide are produced by reacting a monohalo-substituted aromatic compound with an excess of an alkali metal sulfide in a polar organic solvent.

Aromatic thiols such as thiophenol are well-known compounds, some of which are used commercially. For example, thiophenol is used as a rubber plasticizer and in the reclaiming of rubber. One method which has been used for the manufacture of thiophenol is the reduction of benzenesulfonyl chloride with zinc dust in sulfuric acid.

Aliphatic mercaptans and aralkyl mercaptans have been prepared by the reaction of an alkali metal hydrosulfide with alkyl or aralkyl halides. However, extrapolation of this reaction into aryl halides is not feasible because the halogen atom attached to an aromatic nucleus is very difficult to remove therefrom. In copending Ser. No. 326,389, filed Nov. 27, 1963, there is disclosed and claimed a method for the production of diaryl sulfides, dialkaryl sulfides and aryl alkaryl sulfides by reacting at least one of an aryl halide and alkaryl halide with an alkali metal sulfide in a polar organic compound reaction medium. It has now been discovered that an aromatic thiol can be produced when an excess of an alkali metal sulfide (above equimolar) is added to a mono-halo-substituted aromatic compound in a polar organic solvent. It has also been discovered that an aromatic sulfide is also produced.

It is an object of this invention to produce an aromatic thiol. It is a further object of this invention to provide a new and improved process for the production of aromatic thiols and aromatic sulfides. It is a further object of the invention to produce the aromatic thiols in a substantial absence of water.

Other aspects, objects and the several advantages of the invention are apparent to one skilled in the art from a study of this disclosure and the appended claims.

According to the invention, there is provided a process for the production of aromatic thiols by the reaction of at least one nuclear monohalo-substituted aromatic compound with an excess of an alkali metal sulfide, the reaction being conducted in a polar organic solvent, at an elevated temperature and for a time sufficient to carry out the reaction. More specifically, the mol ratio of the alkali metal sulfide to nuclear monohalo-substituted aromatic compounds should be at least 1.5, and preferably above 2.0.

The invention can be illustrated by the following chemical reaction:

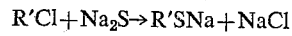

wherein R' represents an aromatic radical. After completion of the reaction, the R'SNa compound can be converted to R'SH by acidification. For example, when R' is phenyl, the produced R'SH compound is thiophenol.

To illustrate the formation of sulfides as by-products, the following equation is illustrative of the results obtained when an excess of aryl chloride is used:

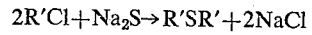

Nuclear monohalo-substituted aromatic compounds which can be used for the starting material according to the invention are represented by the formulas:

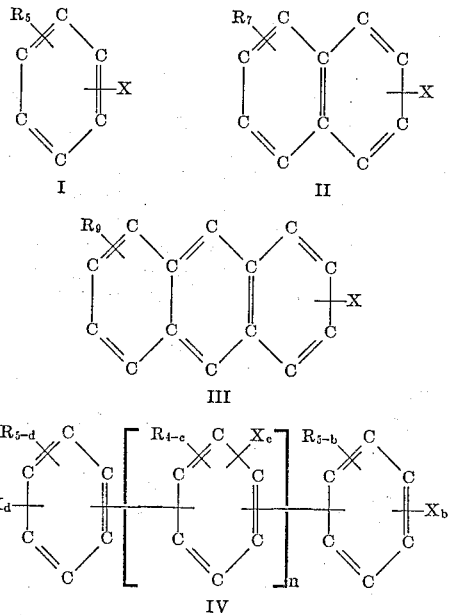

wherein X is selected from the group consisting of chlorine, bromine, fluorine and iodine, wherein R is selected from the group consisting of hydrogen and alkyl and cycloalkyl radicals containing from 1 to 6 carbon atoms, inclusive, wherein $n$, $b$, $c$ and $d$ are each whole integers selected from the group consisting of 0 and 1, wherein the sum $b+c+d=1$, and wherein not more than 4 substituent groups other than hydrogen and halogen are present in the molecule.

Some examples of compounds having the above general formula are:

Chlorobenzene
4-chlorotoluene
Bromobenzene
1-chloro-3-ethylbenzene
1-fluoro-3-isopropylbenzene
1-iodo-2-methyl-4-ethylbenzene
1-bromo-2,4-diethylbenzene
1-chloro-3,4,5,6-tetramethylbenzene
1-chloronaphthalene
4-chlorobiphenyl
2-bromobiphenyl
1-chloro-4-hexylbenzene 1-bromo-2,4,6-tri-n-butylbenzene
4-bromo-p-terphenyl
6-cyclohexyl-1-chloronaphthalene
p-chlorobenzoic acid
8-bromonaphthalene-carboxylic acid
4-trifluoromethylchlorobenzene
4-methoxy-1-chloronaphthalene
4-n-hexoxy-1-fluorobenzene
4-cyclopentylthio-1-bromonaphthalene The alkali metal sulfides which can be employed in the process of this invention are the monosulfides of sodium, potassium, lithium, rubidium and cesium, including the anhydrous and hydrated forms of these sulfides. The preferred sulfide is $Na_2S$ and its hydrates.

The polar organic solvent used in this invention is one in which the halo-substituted aromatics and alkali metal sulfides are at least partially soluble. A preferred class of solvents are amides. Specific examples of suitable solvents include:

N-methyl-2-pyrrolidone
Pyrrolidone
Caprolactam
N-ethylcaprolactam
Dimethylacetamide
Tetramethylurea
Hexamethylphosphoramide
N,N'-ethylenedipyrrolidone The process of this invention is carried out by contacting the above-defined reactants in at least one polar solvent at a temperature of from about 125° C. to about 450° C., preferably from 175° C. to 350° C. The critical feature is that an excess of alkali metal sulfide must be used. Thus, the mol ratio of alkali metal sulfide to halo-substituted aromatic compound should be at least 1.5, and preferably above 2.0. The pressure in the reaction zone will generally be autogenous and this pressure can run as high as 1000 p.s.i. or greater, depending upon the chosen reactants and polar solvent. Reaction times will depend upon the chosen reaction temperature, with the longer reaction times being used at the lower temperatures and vice versa. Reaction times can vary from a few minutes to several days.

The amount of polar organic solvent in the reaction zone can vary over a wide range, but will generally range from about 100 to 2500 ml. of solvent per mol of alkali metal sulfide reactant, preferably about 250 ml.

It is preferred to employ the substantially anhydrous form of the alkali metal sulfides. The sulfides can be charged to the reaction zone in this form, or they can be charged in a hydrated form, utilizing a drying procedure to remove the water of hydration prior to charging the halo-substituted aromatic compound. For example, a hydrated form of the alkali metal sulfide can be mixed with the polar organic reaction solvent and heated to distill water off. This drying can be carried out by adding an additional material such as benzene to the mixture prior to heating. Following the water removal, the resulting solution of anhydrous sulfide in polar organic solvent can be mixed with the desired halo-substituted aromatic compound. If desired, the alkali metal sulfides can be formed in situ by charging alkali metal hydroxide and $H_2S$ to the reaction zone at a mol ratio of at least 2/1 alkali metal hydroxide/$H_2S$.

The reaction can be carried out batch-wise or continuously. Recovery of the aromatic thiol product can be carried out by conventional procedures. For example, at the completion of the reaction, the reaction mixture can be cooled, acidified with a mineral acid such as HCl, filtered to remove alkali metal halide and unreacted alkali metal sulfide, and then treated by such processes as distillation, crystallization, extraction and the like for recovery of the thiol product.

Aromatic sulfides as well as aromatic thiols are produced by the process of the invention. It has been discovered that the percentage of aromatic thiols increases and the percentage of aromatic sulfides decreases with increasing amounts of alkali metal sulfide. Thus, it can be seen that the amount of thiol or sulfide produced can be varied by simply varying the amount of alkali metal sulfide added to the reactor.

Typical aromatic thiols which can be prepared by this process include:

Benzenethiol (thiophenol)
4-methylbenzenethiol
4-carboxybenzenethiol
3-ethylbenzenethiol
Naphthalenethiol
Biphenylthiol
Terphenylthiol
6-trifluoromethylnaphthalenethiol
2,3,4,5-tetramethylbenzenethiol Typical sulfides which can be prepared by this process include:

Diphenyl sulfide
Di(4-methylphenyl) sulfide
Di(3-ethylphenyl) sulfide
Di(2-methyl-4-isopropylphenyl) sulfide
Di(2,4-diethylphenyl) sulfide
Dinaphthyl sulfide
Phenyl 4-methylphenyl sulfide
Di(2-ethyl-4-n-decylphenyl) sulfide
Phenyl naphthyl sulfide
Di(4-biphenylyl) sulfide
Di(4-[p,p'-terphenylyl]) sulfide
4-biphenylyl phenyl sulfide

*Example*

A series of runs was carried out in which chlorobenzene was reacted with sodium sulfide to form thiophenol according to the process of this invention.

In each of these runs, either 195 or 390 grams of $Na_2S$ containing 60 percent sulfide and 40 percent water was mixed with 1,300 ml. of N-methyl-2-pyrrolidone and 500 ml. of benzene and heated until essentially all of the water of hydration was removed. The benzene was also distilled off during this drying step. The resulting solution of alkali metal sulfide in N-methyl-2-pyrrolidone (NMP) was then transferred to a reactor and an additional 200 ml. of NMP was used to rinse down the walls of the reactor. 200 ml. of rinse was used in the first three runs and 600 ml. was used in the last run. The desired amount of chlorobenzene was then added to the sulfide solvent solution after which the resulting mixture was heated to 300° C. for 3 or 3.5 hours. At the end of this time, the reaction mixture was cooled and worked up for recovery of thiophenol and attendant diphenyl sulfide by-product.

The reaction mixture was worked up by acidifying with 1:1 concentrated hydrochloric acid:water until acid to litmus, after which the acidified mixture was extracted with ether. The acidification was to convert the sodium salt of thiophenol to the free thiophenol so that it could be extracted into the ether phase. The ether phase was then extracted with 20 percent aqueous sodium hydroxide to reconvert the thiophenol to the sodium salt which then dissolved in the aqueous phase. After separating the aqueous phase from the ether phase which contained the diphenyl sulfide, the ether phase was then distilled and the diphenyl sulfide by-product was recovered. The separated aqueous phase was then acidified to reconvert the thiophenol salt to free thiophenol using concentrated hydrochloric acid. This acidified phase was then extracted with ether to extract out the thiophenol after which the ether phase was distilled to recover the thiophenol. The yield of each of these materials is shown, along with the conditions used, in the following table.

TABLE

| Run Number | Grams Na₂S (60%) | Mols Na₂S | Grams Chlorobenzene | Mols Chlorobenzene | Ml. NMP [1] | Mol Ratio Na₂S/Chlorobenzene | Time, Hours | Temp., °C. | Yield Thiophenol, Percent of Theory | Yield Diphenyl Sulfide, Percent of Theory |
|---|---|---|---|---|---|---|---|---|---|---|
| 1 | 195 | 1.5 | 113 | 1 | 1,300+200 | 1.5 | 3.5 | 300 | 28 | 62 |
| 2 | 195 | 1.5 | 340 | 3 | 1,300+200 | 0.5 | 3.0 | 300 |  | 87 |
| 3 | 195 | 1.5 | 66 | 0.58 | 1,300+200 | 2.5 | 3.0 | 300 | 53 | 26 |
| 4 [2] | 390 | 3.0 | 168.8 | 1.5 | 1,300+200 | 2.0 | 3.0 | 300 | 55 | ([3]) |

[1] N-methyl-2-pyrrolidone.
[2] 600 ml. of benzene used in the drying step in this run.
[3] Not determined.

The table shows that an excess of sodium sulfide in the reaction will produce thiophenol. Runs 1, 3 and 4 were according to the invention. Run 2 was not according to the invention, using half as much chlorobenzene as sodium sulfide. As it can be noted in the table, Run 2 produced substantially no thiophenol. It can also be noted that the amount of sulfide produced increased with the decreasing mol ratio of Na₂S/chlorobenzene.

It can thus be seen from the above discussion and example that the process of this invention provides a simple, economical process for the production of aromatic thiols. It can also be seen that the method of this invention provides a way in which difficultly removable halogen atoms, attached to an aromatic nucleus, can be exchanged for a thiol substituent.

Reasonable variation and modification are possible within the scope of the foregoing disclosure and the appended claims to the invention, the essence of which is that a nuclear monohalo-substituted aromatic compound is reacted with an excess of alkali metal sulfide in a polar organic solvent at a temperature and for a time sufficient to produce an aromatic thiol and an aromatic sulfide.

I claim:

1. A process for the preparation of an aromatic thiol and an aromatic sulfide which comprises reacting a nuclear monohalo-substituted aromatic compound with an excess of an alkali metal monosulfide in a polar organic solvent selected from N-methyl-2-pyrrolidone, pyrrolidone caprolactam, N-ethyl-caprolactam, dimethylacetamide, tetramethylurea, hexamethylphosphoramide, and N,N'-ethylenedipyrrolidone at an elevated temperature for a time sufficient to carry out said reaction.

2. A process for the preparation of an aromatic thiol and an aromatic sulfide which comprises reacting a nuclear monohalo-substituted aromatic compound with an excess of an alkali metal monosulfide in a polar organic solvent selected from N-methyl-2-pyrrolidone, pyrrolidone, caprolactam, N-ethylcaprolactam, dimethylacetamide, tetramethylurea, hexamethylphosphoramide, and N,N'-ethylenedipyrrolidone at an elevated temperature for a time sufficient to carry out said reaction, and thereafter acidifying the reaction mixture.

3. A process for the preparation of an aromatic thiol and an aromatic sulfide which comprises reacting a nuclear monohalo-substituted aromatic compound with at least 1.5 mols of an alkali metal monosulfide per mol of said compound in a polar organic solvent selected from N-methyl-2-pyrrolidone, pyrrolidone, caprolactam, N-ethyl-caprolactam, dimethylacetamide, tetramethylurea, hexamethylphosphoramide, and N,N'-ethylenedipyrrolidone at a temperature in the approximate range of from 125–140° C. for a time sufficient to carry out said reaction, and thereafter acidifying the reaction mixture.

4. A process for producing an aromatic thiol and an aromatic sulfide which comprises at a temperature in the approximate range of from 125–140° C. reacting with an excess of an alkali metal monosulfide in a polar solvent selected from N-methyl-2-pyrrolidone, pyrrolidone, caprolactam, N-ethylcaprolactam, dimethylacetamide, tetramethylurea, hexamethylphosphoramide, and N,N'-ethylenedipyrrolidone a compound selected from the group represented by the formulas:

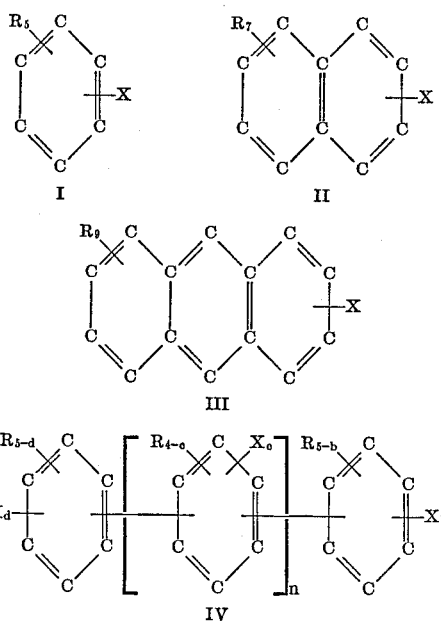

wherein X is selected from the group consisting of chloride, bromine, fluorine and iodine, wherein R is selected from the group consisting of hydrogen and alkyl and cycloalkyl radicals containing from 1 to 6 carbon atoms, inclusive, wherein $n$, $b$, $c$ and $d$ are each whole integers selected from the group consisting of 0 and 1, wherein the sum $b+c+d=1$, and wherein not more than 4 substituent groups other than hydrogen and halogen are present in the molecule and acidifying the reaction mixture.

5. A process according to claim 4 wherein the compound is chlorobenzene.

6. A process according to claim 4 wherein the alkali metal monosulfide is sodium monosulfide.

7. A process according to claim 4 wherein the reaction is carried out at a temperature in the range of 175° to 350° C.

8. A process according to claim 4 wherein the pressure is autogenous.

9. A process according to claim 4 wherein an aromatic sulfide is produced in addition to the aromatic thiol and the ratio of aromatic thiol to aromatic sulfide produced is varied by varying the amount of said sodium sulfide added to the mixture.

10. A process for the production of thiophenol which comprises reacting in ratio of one mol of monochlorobenzene with at least 1.5 mols of sodium monosulfide in N-methyl-2-pyrrolidone at a temperature of about 300° C. for about three hours, cooling the mixture, acidifying the mixture, and recovering thiophenol therefrom.

References Cited

UNITED STATES PATENTS 2,949,487  8/1960  Rocklin _____ 260—609

CHARLES B. PARKER, *Primary Examiner.*

JOSEPH P. BRUST, *Examiner.*

D. R. PHILLIPS, *Assistant Examiner.*